US008135176B2

(12) United States Patent
Wuerz-Wessel et al.

(10) Patent No.: US 8,135,176 B2
(45) Date of Patent: Mar. 13, 2012

(54) METHOD FOR DETERMINING THE SELF-MOTION OF A VEHICLE

(75) Inventors: Alexander Wuerz-Wessel, Stuttgart (DE); Fridtjof Stein, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 689 days.

(21) Appl. No.: 11/792,208

(22) PCT Filed: Dec. 23, 2005

(86) PCT No.: PCT/EP2005/057161
§ 371 (c)(1),
(2), (4) Date: Feb. 24, 2009

(87) PCT Pub. No.: WO2006/072555
PCT Pub. Date: Jul. 13, 2006

(65) Prior Publication Data
US 2009/0214077 A1    Aug. 27, 2009

(30) Foreign Application Priority Data
Jan. 4, 2005  (DE) .......................... 10 2005 000 651

(51) Int. Cl.
*G06K 9/00*  (2006.01)
*G01C 21/00*  (2006.01)

(52) U.S. Cl. .......................... 382/107; 382/291; 701/214

(58) Field of Classification Search .................. 382/100, 382/103–107, 113, 120, 12, 123, 155, 162, 382/168, 170, 171, 172, 173, 181, 189, 193, 382/199, 209, 232, 254–260, 274, 276, 287–291, 382/305, 312; 701/46, 45, 32, 214, 1; 340/572.1, 340/539.11
See application file for complete search history.

(56) References Cited

U.S. PATENT DOCUMENTS

| 7,089,099 | B2* | 8/2006 | Shostak et al. | 701/32 |
| 7,330,784 | B2* | 2/2008 | Johnson et al. | 701/45 |
| 7,477,758 | B2* | 1/2009 | Piirainen et al. | 382/100 |
| 7,786,864 | B1* | 8/2010 | Shostak et al. | 340/572.1 |
| 7,983,802 | B2* | 7/2011 | Breed | 701/1 |
| 8,035,508 | B2* | 10/2011 | Breed | 340/539.11 |
| 8,041,483 | B2* | 10/2011 | Breed | 701/46 |

OTHER PUBLICATIONS

Giachetti, A. et al.: "The Use of Optical Flow for Road Navigation" IEEE Transactions on Robotics and Automation, IEEE Inc., New York, US, Bd. 14, Nr. 1, Feb. 1, 1998, pp. 34-48.

(Continued)

*Primary Examiner* — Seyed Azarian
(74) *Attorney, Agent, or Firm* — Kenyon & Kenyon LLP

(57) ABSTRACT

A method and a device for determining the self-motion of a vehicle in an environment are provided, in which at least part of the environment is recorded via snapshots by an imaging device mounted on the vehicle. At least two snapshots are analyzed for determining the optical flows of image points, reference points that seem to be stationary from the point of view of the imaging device being ascertained from the optical flows. The reference points are collected in an observed set, new reference points being dynamically added to the observed set with the aid of a first algorithm, and existing reference points being dynamically removed from the observed set with the aid of a second algorithm.

13 Claims, 1 Drawing Sheet

OTHER PUBLICATIONS

Gehrig, S. K. et al.: "Dead reckoning and cartography using stereo vision for an autonomous car" Intelligent Robots and Systems, 1999, IROS '99. Proceedings, 1999 IEEE/RSJ International Conference on Kyongju, South Korea Oct. 17-21, 1999, Piscataway, NJ, USA, IEEE, US, Bd. 3, Oct. 17, 1999, pp. 1507-1512.

Smith, S. M.: "Asset-2: Real-Time Motion Segmentation and Object Tracking" Real-Time Imaging, Academic Press Limited, GB, Bd. 4, Nr. 1, Feb. 1998, pp. 21-40, p. 237, p. 239.

Shi, J. et al: "Good Features to Track" Proceedings of the Computer Society Conference on Computer Vision and Pattern Recognition, Seattle, Jun. 21-23, 1994, Los Alamitos, IEEE Comp. Soc. Press, US, Jun. 21, 1994, pp. 593-600) (whole document).

Iterative Closest Point Algorithm, P. J. Besl and N.D. McKay (A method for registration of 3-D shapes. PAMI, 14(2): 239-256, Feb. 1992).

Ransac (M.A. Fischler, R. C. Bolles. Random Sample Consensus: A Paradigm for Model Fitting with Applications to Image Analysis and Automated Cartography. Comm. Of the ACM, vol. 24, pp. 381-395, 1981).

* cited by examiner

METHOD FOR DETERMINING THE SELF-MOTION OF A VEHICLE

BACKGROUND OF THE INVENTION

1. Field of the Invention

The present invention relates to a device and a method for determining the self-motion of a vehicle in an environment.

2. Description of Related Art

Methods for determining the self-motion of a vehicle are known. Methods of this type are to be classified under the subject area of "sighted cars," although these methods may be applied to a variety of vehicle types in principle. These methods are based on recording the environment in which the vehicle is moving with the aid of imaging methods and processing it computationally. The environment, including the objects located therein, is analyzed on the basis of the analysis of the image data, and the driver of the vehicle is provided with additional data, for example, regarding the occurrence of obstacles or the approach of other vehicles. In order to analyze the image data regarding such information which is important to the driver and his/her driving behavior, the analysis of the image data regarding the instantaneous direction of travel of the vehicle, among other things, is of importance. A point or an area toward which the vehicle seems to be steering is regularly ascertained with the aid of a snapshot produced by an imaging device. This point or area is referred to as focus of expansion (FOE). It is the projection of the direction of movement of the camera on the image plane. Since the instantaneous image shows only part of the environment, the center of expansion does not necessarily need to be located within the image section of the snapshot. For example, in the case of a rotary motion, the center of expansion is in infinity in the corresponding direction of rotary movement. To ascertain the center of expansion, the optical flow, among other things, of selected (or all) image points of the snapshots between two snapshots taken at two separate points in time is determined. In simple terms, this means that the direction and absolute value of the motion of the image points over time is ascertained. The optical flow of an image point may also be understood as a motion vector. Stationary points, i.e., points or structures (image features) that do not move in consecutive snapshots are relevant for determining the center of expansion. The optical flow of such points may be zero, almost zero, or less than a defined threshold value. Stationary points may arise by the observed structures being located so far from the imaging device that their relative motion is negligible (background structures). Furthermore, stationary points may arise by an observed object not moving relative to the camera, as is the case, for example, of parts of the host vehicle or a preceding vehicle traveling in the same direction at the same velocity. In particular in traffic it seldom happens that these stationary points are actually stationary for a longer period of time, since, for example, the vehicle may turn a corner, the preceding vehicle which up to that point was traveling at a constant speed may accelerate or brake, or a stationary point located far away may be hidden by a vehicle cutting in. Methods according to the related art do not provide a satisfactory method for ascertaining the self-motion of the vehicle quickly and reliably, particular in rapidly changing environments.

A BRIEF SUMMARY OF THE INVENTION

According to the present invention, new reference points (stationary points) are dynamically added to the observed set with the aid of a first algorithm, and existing reference points are dynamically removed from the observed set with the aid of a second algorithm. This means that the observed set is constantly adjusted to the changing environmental conditions regarding the reference points it contains. Image points are investigated, with the help of a first algorithm, to determine whether they meet the criteria of a stationary point, i.e., whether they should be included in the observed set as reference points. It is determined, with the help of the second algorithm, whether certain reference points no longer meet the criteria of a stationary point and should be removed from the observed set. This is a dynamic process, i.e., image points and reference points may be checked and the observed set may be adjusted continuously, so that an observed set having up-to-date reference points is always available even in a rapidly changing environment. In view of the above-mentioned criteria, it should be pointed out here that the criteria will be regularly checked taking statistical aspects into account and/or using threshold values.

The first algorithm includes steps for ascertaining image points whose optical flow is zero or almost zero. The check of the optical flow may extend to all points or only to selected image points. If an image point having a zero or almost-zero optical flow has been ascertained, it may be assumed to be a stationary point. The image point is then included in the observed set as a reference point. In determining whether or not an image point is stationary, a threshold value may be used, so that not only image points whose optical flow is exactly zero, but also image points whose optical flow is approximately zero are recognized. A suitable threshold value for the particular application is easily determinable experimentally by those skilled in the art.

In an advantageous example embodiment of the present invention, the first algorithm includes steps for ascertaining image points whose optical flow is equal to the optical flow ascertained for a majority of reference points. It has been recognized that an image point having an optical flow which is equal to the flow of a majority of reference points, i.e., already ascertained stationary points, is also a sign of a stationary point. This makes it possible to ascertain new reference points even in difficult situations in which no image points having a zero optical flow have been obtained. The majority of reference points whose optical flow is compared to that of the image point may arise in different ways. It is provided according to the present invention that the greatest set of locally contiguous reference points be considered, the number of necessary reference points be described as a percentage of the totality of reference points, or significant reference points or sets of reference points be determined with the aid of mathematical, e.g., statistical, methods. Also in this case, it is not necessary that the optical flow of the image point being considered be exactly equal to the optical flow of the selected reference points. Rather, a statistically significant match or being within predefined tolerance limits may be sufficient. Also in this case, those skilled in the art will establish, within narrower or broader limits, the range in which a match of optical flows is considered sufficient as a function of the required characteristic.

The first algorithm advantageously includes steps for filtering the image points with the aid of a Kalman filter. The mode of operation and construction of a Kalman filter are sufficiently known from the related art and therefore need not be described in detail. The boundary conditions input in the Kalman filter may be a maximum optical flow and, if a plurality of snapshots are analyzed, a minimum or maximum acceleration of image points. Image points that do not meet the predefined conditions, i.e., probably do not sufficiently represent the environment for different reasons, are dampened or suppressed by the Kalman filter. This improves the result regarding the admission of new reference points into the observed set.

The first algorithm includes steps for ascertaining at least one object group from locally contiguous reference points. This allows the analyses, which include reference points, to be improved and facilitated. For example, by generating object groups, it is no longer necessary to compare a plurality of individual points, but a comparison of shapes may be used, such as described, for example, in Iterative Closest Point Algorithm, P. J. Besl and N. D. McKay (A method for registration of 3-D shapes. *PAMI*, 14(2):239-256, February 1992). Known methods for comparing sets, such as, for example, RANSAC (M. A. Fischler, R. C. Bolles. Random Sample Consensus: A Paradigm for Model Fitting with Applications to Image Analysis and Automated Cartography. Comm. of the ACM, Vol. 24, pp 381-395, 1981) may also be used.

The second algorithm includes steps for ascertaining permanently present reference points having unchanged positions. Reference points that for a long time or even always are the same have little or no relevance, because they are regularly parts of the host vehicle in the viewing field of the imaging device or dirt in the area of the imaging device's optical system. If image areas capable of resulting in reference points having no informational content are known in advance, in principle these areas may be removed from the image analysis.

The second algorithm includes steps for ascertaining a first optical flow of a majority of reference points in comparison with at least one second optical flow of a minority of reference points. The terms majority and minority are not to be understood in their numerical sense only. Instead, it is possible and conceivable that a numerically smaller number of reference points is to be understood as majority because of a higher weighting of image points in certain areas or of reference points belonging to an object group. The above-provided analysis is advantageous in particular. Namely, if during the analysis of the snapshot it turns out that a large number of reference points (or a number of highly weighted reference points) moves differently compared to another part of the reference points, for example, when the first optical flow is approximately zero and the second optical flow is substantially greater than zero, it is to be assumed that the reference points having the second optical flow belong to a previously unmoving object with respect to the imaging device and are not actually stationary. These reference points recognized as self-moving are removed from the observed set, and only the remaining stationary reference points are pursued further.

In accordance with the present invention, the second algorithm includes steps for filtering the reference points with the aid of a Kalman filter. In this case, boundary conditions, for example, for the magnitude of actually expected movements of reference points, may be predefined for the Kalman filter. If the movement of a reference point exceeds a predefined threshold value only once or only briefly, for example, this may be taken into account by the Kalman filter and a premature removal of the reference point from the observed set may be prevented.

At least some of the reference points of the observed set are advantageously stored at different points in time and a variation of the reference points is determined from the stored data. It may thus be checked whether a certain point has developed within the expected limits regarding absolute value and direction of the optical flow according to its classification. The analysis of the stored data may also be used for triggering the removal of a point (for example, a self-moving object) from the observed set. It is also possible to supply all image points or a selection thereof into a Kalman filter and then to correct the previous set of points using the filter result. Subsequently all consistent image points, i.e., the image points whose flows have expected values within the boundary conditions set, may then be further processed.

An angular self-motion of the imaging device or the vehicle may be advantageously calculated from an identical optical flow of a majority of reference points. If a joint motion of a majority of reference points in the observed set is occurring, this may make it possible to infer an angular self-motion of the imaging device or the vehicle. The angular components of pitch, yaw, and roll angles may be ascertained by analyzing the joint motion. Also in this case, the previously proposed methods may be used to draw a conclusion as to when a majority of reference points is moving with respect to the other reference points and to allow inference of an angular self-motion. In principle, in the event of an angular self-motion of the imaging device a motion of the same shape of all reference points should occur; however, this usually does not happen in practice due to the highly dynamic boundary conditions. Therefore it is expedient and sufficient for the particular application to determine the suitable threshold value and the suitable method for ascertaining the majority.

It is advantageous if an angular motion of the imaging device or the vehicle is described using a mathematical system of equations and coefficients for calculating the angular self-motion are ascertained by filtering the ascertained observed sets in the time range. This makes analysis and/or weighting of individual points unnecessary. Such a determination of the angular self-motion may be supported in particular by a Kalman filter.

According to an example embodiment of the present invention, an ascertained angular self-motion is relayed to control functions of the vehicle and is taken into account thereby in determining and/or executing control interventions. The term "control" is to be understood as both control without feedback and regulation with feedback. Control functions of the vehicle include in particular brake functions such as anti-lock systems or brake support and stabilization functions such as an electronic stabilization program. By taking into account the data ascertained for the self-motion of the vehicle, the control and/or regulation interventions concerning the driving behavior of the vehicle may be used in a more precisely targeted manner. It is advantageous in particular if the angular self-motion is relayed to the control functions.

It is advantageous if an ascertained angular self-motion is taken into account in the analysis of the optical flows in that the optical flows are cleaned of the component that depends on the angular self-motion, thus obtaining optical flows caused by essentially purely translational motion. Deviations from this translational field allow one to infer the presence of self-moving objects. In addition, depth graduations and/or objects having the same direction of movement but a relative velocity as occurs in the case of a passing vehicle, for example, may be ascertained using length comparisons in the translational field.

The present invention further provides a device for carrying out a method for determining the self-motion of a vehicle in an environment, which device includes an imaging device used for recording the environment with the aid of snapshots, an ascertaining device for determining the optical flow with the aid of the snapshots, a memory device for storing an observed set of reference points which seem to be stationary from the point of view of the imaging device, a first logic circuit implementing a first algorithm for determining reference points to be added to the observed set, and a second logic circuit implementing a second algorithm for determining reference points to be removed from the observed set.

DETAILED DESCRIPTION OF THE INVENTION

Figure 1:
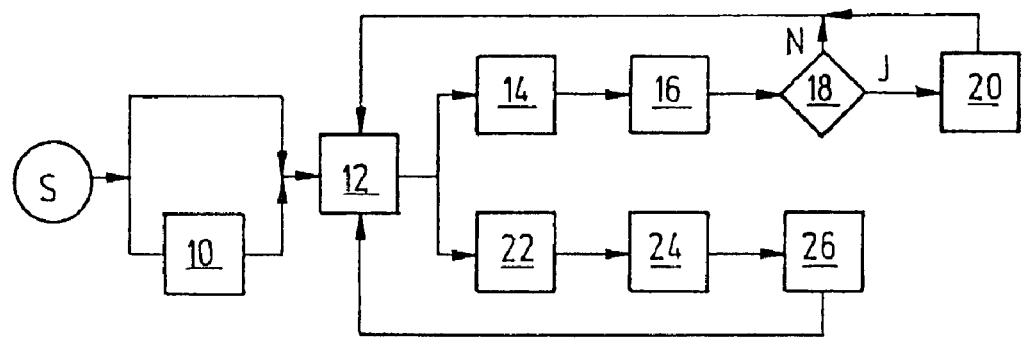
FIG. 1 shows a flowchart of a method for determining the self-motion of a vehicle.

FIG. 1 shows a method for determining the self-motion of a vehicle, e.g., the angular self-motion of the vehicle. The method is started, for example, when starting up the vehicle, at point S. First, the environmental data may be initially recorded in an optional initialization step 10. This includes in particular the first calculation of an optical flow, the first establishment of reference points of an observed set, and the first determination of the joint flow of the reference points. The term joint flow is to be understood as an averaged treatment of the individual optical flows, which describes a general, shared optical flow of all or at least a majority of reference points. Depending on the desired application, different methods such as mean value, median, geometric mean, statistical and/or stochastic analyses may be used. The important thing is, in particular, to be able to derive information as to which image points or reference points are actually stationary and what optical flows these stationary points have. Initialization step 10 is not mandatory, since the admission and removal of reference points is a dynamic procedure, which may be performed using only the method steps described below.

An optical flow is calculated from two snapshots in step 12. Methods for determining the optical flow are known in many variants and are described in detail in the related art. The optical flow data obtained in step 12 may now be analyzed in two different ways. The first processing method having steps 14, 16, and 20, as well as comparison step 18, and the second processing method having steps 22, 24, and 26, may be operated either individually and, as an alternative and taking the appropriate precautions, also combined.

In the first example processing method, a check regarding the reference points (stationary points) is first performed in check step 14. This means that image points recognized as stationary points are admitted into the observed set as reference points; reference points that no longer meet the criteria of a stationary point are taken out from the observed set. The locally contiguous reference points may also be ascertained in this step. After check step 14, the joint flow of the reference points is ascertained in step 16. The result of the joint flow is compared to a previously ascertained joint flow in comparison step 18. If data for a previously ascertained joint flow are not yet available, the newly ascertained joint flow is compared to a standard value, in particular to zero. If no change in the joint flow is determined, the method is continued via branch N and goes back to known step 12. If a change in the joint flow is determined, i.e., the camera and thus the vehicle has performed an angular self-motion, the method branches, via branch Y, to computation step 20, in which a new angular self-motion is computed using a direct calculation or a Kalman filter. The method is then continued with step 12.

According to the second example processing method, the optical flows obtained in step 12 are processed in step 22 using a Kalman filter. Data which model the actual environment from which the measured values originate are input into the Kalman filter. This is elucidated for the pitch motion of a vehicle as an example. For certain vehicles in certain environments it may be assumed, for example, that the pitch motion does not regularly exceed a value of ±2° and the pitch rate a value of ±1°/sec. This information is input into the Kalman filter, so that in the event of measured values exceeding those values, in particular in the event of a substantial excess, the data of the corresponding points are dampened and/or eliminated. The reference points known from the first processing method are checked in the second processing method in step 24 now on the basis of the data from the Kalman filtering of step 22.

The new angular self-motion, which is equal to zero if the vehicle has no angular self-motion, is then calculated in step 26 from the data of step 22. The new ascertained angular self-motions of the first and/or second processing methods are relayed to control units which are situated in the vehicle or associated with the vehicle.

Figure 2:
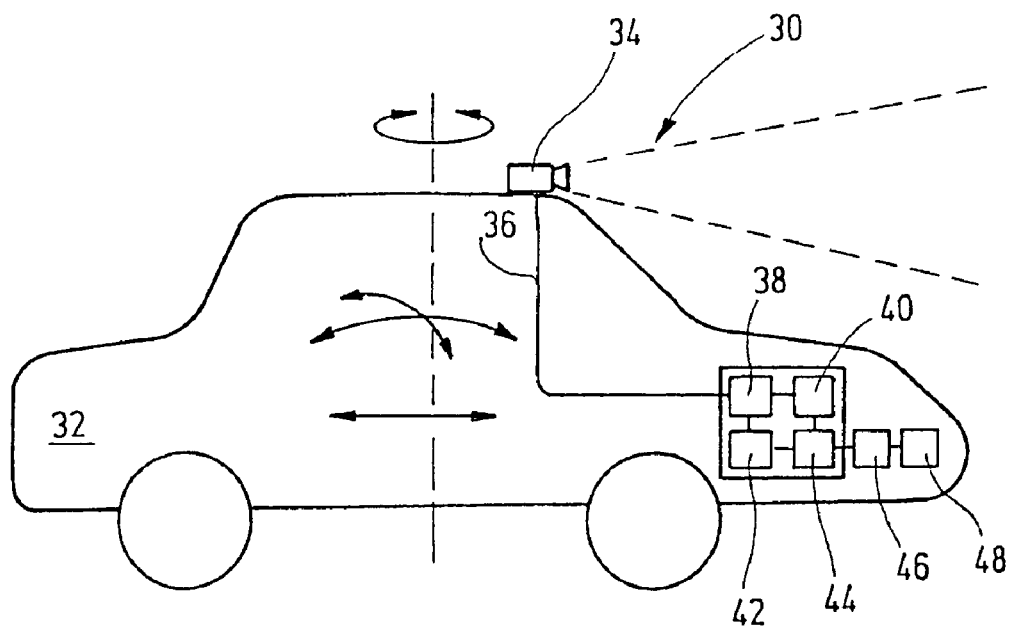
FIG. 2 shows a schematic diagram of a device for carrying out a method for determining the self-motion of a vehicle.

FIG. 2 shows a device 30 for carrying out a method for determining the self-motion of a vehicle 32. The device has an imaging device 34, which records at least part of the environment of vehicle 32 with the aid of snapshots. The motion of vehicle 32 is indicated by the arrows. The image data are relayed, via a data line 36, to an ascertaining device 38, in which the optical flows at least of selected image points are ascertained from the image data of the snapshots. Data may be stored in a memory device 40. This is normally a temporary storage, which may apply to snapshots, individual image sections, image points, reference points, point groups, optical flows, or other measured data or processed data. A first logic circuit 42 and a second logic circuit 44 are associated with ascertaining device 38 and memory device 40. The image data are analyzed by first logic circuit 42 to identify stationary points in the image data of the snapshots. The second logic circuit is used mainly for investigating the observed set for reference points to be possibly removed. The data obtained are analyzed for a self-motion, in particular an angular self-motion, in downstream analyzing device 46. Reference is made to the previous discussion regarding the analysis of the data. The data ascertained by analyzing device 46 are supplied in this example to a control unit 48 of vehicle 32, for example, an electronic stability program, and are taken into account in the calculation of regulating interventions.

What is claimed is:

1. A method for determining a self-motion of a vehicle in a surrounding environment, comprising:

recording a plurality of snapshots of at least part of the environment by an imaging device fixed in a selected position on the vehicle;

analyzing at least two snapshots for determining optical flows of image points, wherein reference points that appear to be stationary from the point of view of the imaging device are ascertained from the optical flows, and wherein the reference points are grouped in an observed set; and dynamically changing the observed set, wherein new reference points are dynamically added to the observed set with the aid of a first predetermined algorithm, and existing reference points are dynamically removed from the observed set with the aid of a second predetermined algorithm, and wherein the second predetermined algorithm includes at least one step for ascertaining permanently present reference points having unchanged positions.

2. The method as recited in claim 1, wherein the first predetermined algorithm includes at least one step for ascertaining image points whose optical flow is substantially zero.

3. The method as recited in claim 1, wherein the first predetermined algorithm includes at least one step for ascertaining image points whose optical flow corresponds to optical flow ascertained for a majority of reference points.

4. The method as recited in claim 1, wherein the first predetermined algorithm includes at least one step for filtering image points with the aid of a Kalman filter.

5. The method as recited in claim 1, wherein the first predetermined algorithm includes at least one step for ascertaining at least one object group from locally contiguously positioned reference points.

6. The method as recited in claim 1, wherein the second predetermined algorithm includes steps for ascertaining a first optical flow of a majority of reference points with respect to at least one second optical flow of a minority of reference points.

7. The method as recited in claim 1, wherein the second predetermined algorithm includes at least one step for filtering the reference points with the aid of a Kalman filter.

8. The method as recited in claim 1, wherein at least some of the reference points of the observed set are stored at different points in time, and wherein a curve of the reference points is determined from stored data.

9. The method as recited in claim 1, wherein an angular self-motion of one of the imaging device or the vehicle is calculated from an identical optical flow of a majority of reference points.

10. The method as recited in claim 9, wherein the ascertained angular self-motion is relayed to at least one control unit of the vehicle, and wherein the ascertained angular self-motion is taken into account by the at least one control unit in at least one of determining and executing a control intervention.

11. The method as recited in claim 9, wherein the ascertained angular self-motion is taken into account in the analysis of the optical flows such that the optical flows are filtered of a component that depends on the angular self-motion, whereby optical flows caused by substantially purely translational motion are obtained.

12. The method as recited in claim 1, wherein an angular self-motion of one of the imaging device or the vehicle is described using a mathematical system of equations, and wherein coefficients for calculating the angular self-motion are ascertained by filtering the ascertained observed set in the time range.

13. A device for determining a self-motion of a vehicle in a surrounding environment, comprising:
    an imaging device for recording a plurality of snapshots of at least part of the environment, wherein the imaging device is fixed in a selected position on the vehicle;
    an ascertaining device for determining optical flows of image points by analyzing at least two snapshots, wherein reference points that appear to be stationary from the point of view of the imaging device are ascertained from the optical flows, and wherein the reference points are grouped in an observed set;
    a memory device for storing the observed set of the reference points; and
    dynamically changing the observed set, wherein new reference points are dynamically added to the observed set with the aid of a first predetermined algorithm, and existing reference points are dynamically removed from the observed set with the aid of a second predetermined algorithm;
    a first logic circuit and a second logic circuit for dynamically changing the observed set, wherein new reference points to be dynamically added to the observed set are determined with the aid of a first predetermined algorithm implemented by the first logic circuit, and wherein existing reference points to be dynamically removed from the observed set are determined with the aid of a second predetermined algorithm implemented by the second logic circuit.

* * * * *